No. 877,452. PATENTED JAN. 21, 1908.
W. A. PRESTON.
HARROW.
APPLICATION FILED JUNE 27, 1907.
3 SHEETS—SHEET 1.
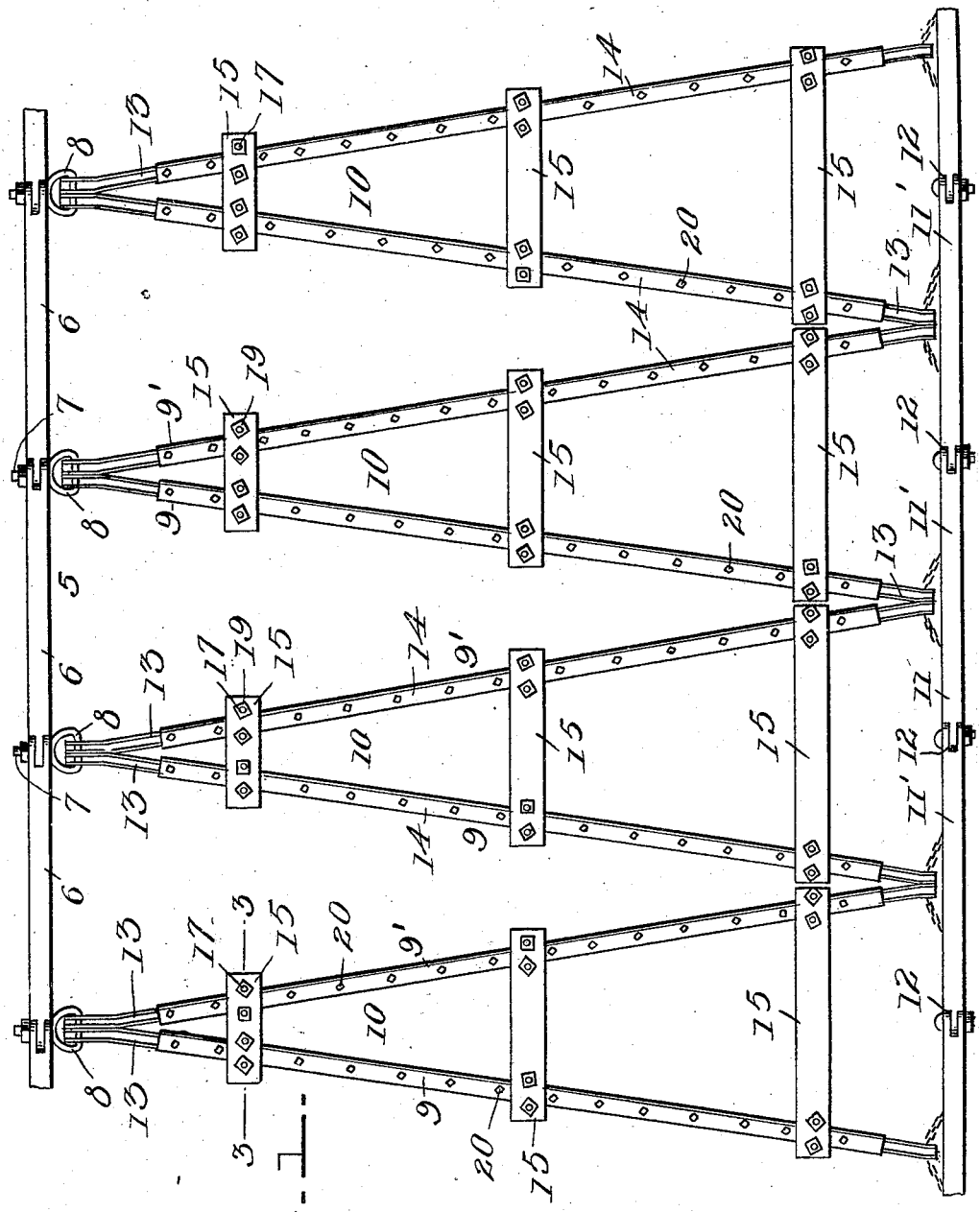
Witnesses
Inventor
W. A. Preston,
By Woodward and Chandler
Attorneys

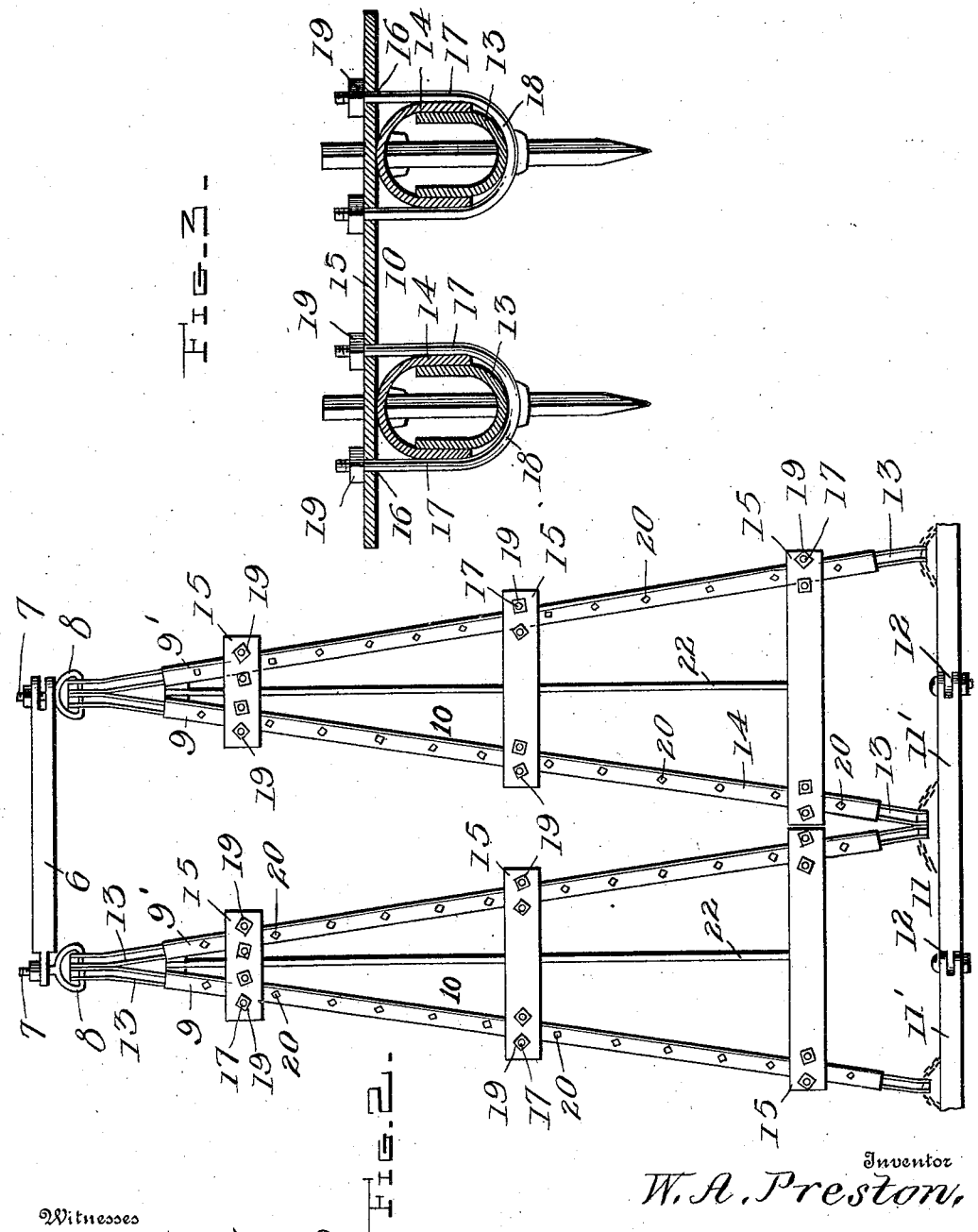

No. 877,452. PATENTED JAN. 21, 1908.
W. A. PRESTON.
HARROW.
APPLICATION FILED JUNE 27, 1907.

3 SHEETS—SHEET 3.

Witnesses

Inventor
W. A. Preston,
By Woodward and Chandler
Attorneys

UNITED STATES PATENT OFFICE.

WILLIAM A. PRESTON, OF ROE, ARKANSAS.

HARROW.

No. 877,452.   Specification of Letters Patent.   Patented Jan. 21, 1908.

Application filed June 27, 1907. Serial No. 381,099.

*To all whom it may concern:*

Be it known that WILLIAM A. PRESTON, a citizen of the United States, residing at Roe, in the county of Monroe and State of Arkansas, has invented certain new and useful Improvements in Harrows, of which the following is a specification.

This invention relates to farm implements, and more particularly to harrows and has for its object to provide a harrow including a plurality of sections capable of independent movement, each of said sections including ground-treating teeth and being arranged for operation to vary the angle of the teeth.

Other objects and advantages will be apparent from the following description and it will be understood that changes in the specific structure shown and described may be made within the scope of the claims without departing from the spirit of the invention.

Figure 4:
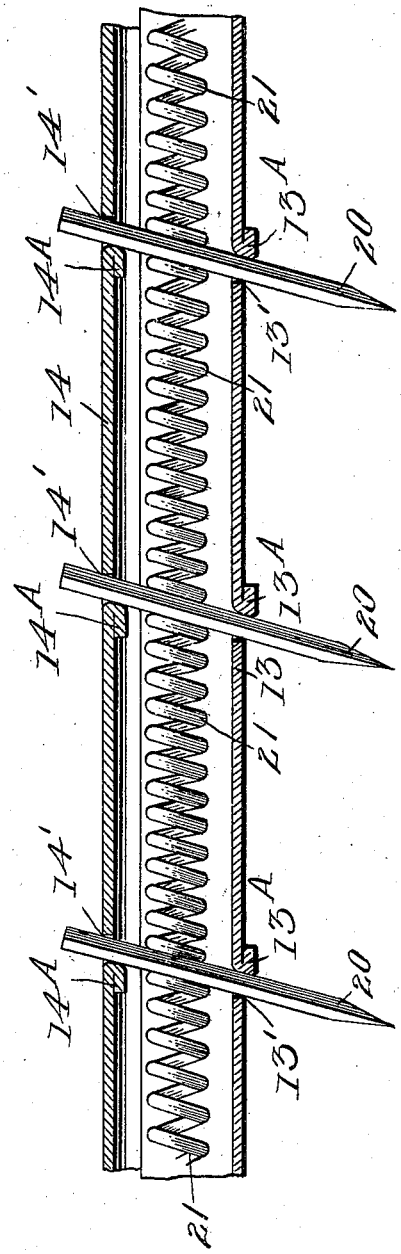
Figure 5:
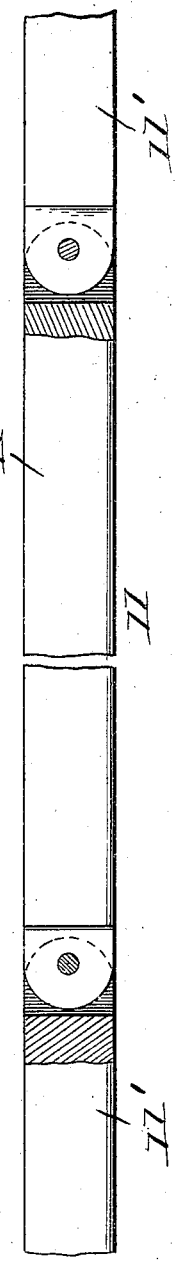

In the drawings forming a portion of this specification, and in which like numerals of reference indicate similar parts in the several views, Figure 1 is a top plan view of a two horse harrow, constructed in accordance with the present invention; Fig. 2 is a similar view of a one horse harrow; Fig. 3 is a transverse section on line 3—3 of Fig. 1; Fig. 4 is a longitudinal section through one of the tooth bars; Fig. 5 is a longitudinal section through the rear members.

Referring now to the drawings, the present invention comprises a front member 5 comprising a plurality of sections 6, pivotally connected by means of bolts 7 engaged in overlapping portions thereof. The rearward ends of these bolts 7 carry eyes 8 with each of which are engaged the forward ends of rearwardly extending divergent members 9, and 9' each pair of these members forming a harrow element 10, as will be understood.

The rearward ends of the members 9' are pivoted to the rearward ends of the members 9 of the adjacent elements 10, and the rearward ends of the several members 9 and 9' are connected by a sectional rear bar 11 having the joints 12 of its sections 11' located between the rearward ends of the members 9 and 9'. The harrow is thus arranged for movement of its different elements to conform to any inequalities of the ground.

Each of the members 9 and 9' consists of two bars 13 and 14 of U-shape in cross section, the bar 14 is disposed with its concave surface downward and with its longitudinal edge portion outwardly of those of the bar 13, which has its concave surface directed upward. Transversely extending plates 15 are provided for each harrow element 10 and are disposed upon the members 9 and 9', these plates having pairs of openings 16 adjacent to their ends, which receive the ends of the upwardly extending legs 17 of attaching yokes, which have their bights 18 engaged beneath the bars 13 of the members. These yokes thus coact with the plates 15 to hold the bars 13 and 14 together, as well as attaching the plates to the members. Nuts 19 are engaged at the upper ends of the legs 17 and may be loosened to allow sliding movement of the members 13 and 14 longitudinally of each other for a purpose to be presently described. Longitudinal series of openings 13' and 14' respectively are formed in the bars 13 and 14, these openings being arranged in pairs to receive vertically extending harrow teeth 20, which depend from the members 9 and 9', as shown. Enlargements 13$^A$ are formed at the rearward sides of the openings 13 to receive the teeth 20 thereagainst and similar enlargements 14$^A$ are formed at the forward sides of the openings 14, for a similar purpose. These enlargements are formed, as shown, of the portions of the metal of the bars stamped therefrom to form the openings 14', the metal being bent downwardly and against the inner face of the bar 14. It will be understood that the enlargements 13$^A$ are formed in a similar manner. It will thus be seen that when the two bars 13 and 14 are moved longitudinally with respect to each other, the slant of the teeth 20 will be varied. Strong helical springs 21 are disposed between the adjacent teeth 20, these springs bearing against the teeth to hold them against movement through the openings. It will be understood that the teeth may be struck with a hammer to move them against the action of the springs.

In Fig. 2, the harrow elements 10 are each provided with a central longitudinally supporting member 22.

What is claimed is:

1. In a harrow, the combination with a member including slidably connected bars, of teeth engaged transversely through the bars, springs engaged between the teeth and means for holding the bars against movement with respect to each other.

2. In a harrow, the combination with spaced members, each including bars arranged for sliding movement with respect to each other, of cross members bridging the space between the first named members, and means for holding the cross members to the first named members, said means being also arranged to hold the bars of said members against movement with respect to each other.

3. In a harrow, the combination with spaced members each including two slidably connected bars, of plates disposed upon the members, yokes engaged around the members and having their legs engaged through the plates and fastening devices engaged with the legs for operation to clamp the bars between the yokes and plates, to hold the bars against movement.

4. In a harrow, the combination with bars arranged for sliding movement with respect to each other, said bars having tongues stamped therefrom to form openings, teeth engaged in the openings, said tongues being bent to receive the teeth thereagainst beyond the openings, and means for holding the bars against movement with respect to each other.

In testimony whereof he affixes his signature, in presence of two witnesses.

WILLIAM A. PRESTON.

Witnesses:
F. C. TRICE,
A. L. TRICE.